(12) United States Patent
Harrison et al.

(10) Patent No.: US 7,533,841 B1
(45) Date of Patent: May 19, 2009

(54) FIBER OPTIC CABLE SPOOL

(75) Inventors: Carl G. Harrison, Plano, TX (US);
Michael A. Mandry, Frisco, TX (US)

(73) Assignee: Cisco Technology, Inc., San Jose, CA (US)

( * ) Notice: Subject to any disclaimer, the term of this patent is extended or adjusted under 35 U.S.C. 154(b) by 161 days.

(21) Appl. No.: 10/304,314

(22) Filed: Nov. 26, 2002

Related U.S. Application Data

(63) Continuation of application No. 09/590,811, filed on Jun. 9, 2000, now Pat. No. 6,511,009.

(51) Int. Cl.
*B65H 75/38* (2006.01)
*B65H 75/14* (2006.01)
*G02B 6/00* (2006.01)

(52) U.S. Cl. .................. 242/388.5; 242/602.2; 385/135
(58) Field of Classification Search .............. 242/388.5, 242/388.1, 378.3, 378.1, 378.2, 603, 602, 242/602.1, 602.2, 602.3, 378, 388, 388.2; 385/134, 135; 24/71.1
See application file for complete search history.

(56) References Cited

U.S. PATENT DOCUMENTS

| | | | | |
|---|---|---|---|---|
| 629,115 | A | * | 7/1899 | Turney ........................ 242/603 |
| 1,689,016 | A | * | 10/1928 | Erlewine ..................... 242/603 |
| 2,272,228 | A | * | 2/1942 | Thornburg et al. ........... 242/603 |
| 3,339,860 | A | * | 9/1967 | Riggles, Jr. ................. 242/602.2 |
| 3,474,985 | A | * | 10/1969 | Brudi et al. ................ 242/378.4 |
| 3,601,331 | A | * | 8/1971 | Frey et al. .................... 242/377 |
| 3,695,544 | A | * | 10/1972 | Morey, Sr. ................ 242/378.2 |
| 4,053,118 | A | * | 10/1977 | Aikins ....................... 242/378.2 |
| 4,098,470 | A | * | 7/1978 | Clark ........................ 242/607.2 |
| 4,288,042 | A | * | 9/1981 | Sendzimir ................. 242/364.1 |
| 4,387,863 | A | * | 6/1983 | Edmonston et al. ....... 242/118.4 |
| 4,417,703 | A | * | 11/1983 | Weinhold .................. 242/378.3 |
| 4,441,661 | A | * | 4/1984 | Steinmair ................. 242/364.1 |
| 4,489,902 | A | * | 12/1984 | Chaconas et al. ......... 242/388.1 |
| 4,497,452 | A | * | 2/1985 | Sendzimir ................. 242/364.1 |
| 4,653,833 | A | * | 3/1987 | Czubernat et al. ........... 439/528 |
| 4,696,438 | A | * | 9/1987 | Myers .................... 242/118.41 |
| 4,792,203 | A | * | 12/1988 | Nelson et al. ................ 385/135 |
| 4,846,343 | A | * | 7/1989 | Rupert ......................... 206/303 |
| 4,901,938 | A | * | 2/1990 | Cantley et al. ............ 242/378.1 |
| 4,974,789 | A | * | 12/1990 | Milburn ....................... 242/159 |
| 5,013,121 | A | * | 5/1991 | Anton et al. ................. 385/135 |
| 5,588,626 | A | * | 12/1996 | Yang ........................ 242/378.1 |

(Continued)

FOREIGN PATENT DOCUMENTS

GB 2.166.115 A * 4/1986
GB 2166115 A * 4/1986

*Primary Examiner*—Patrick Mackey
*Assistant Examiner*—Mark Beauchaine
(74) *Attorney, Agent, or Firm*—Campbell Stephenson LLP

(57) ABSTRACT

A spool for holding cable is disclosed. The spool has an S shaped cable pathway for connecting a first circumferential cable pathway with a second circumferential cable pathway. In one embodiment, the spool includes an S shaped groove extending through the middle portion of the spool to define the S shaped cable pathway. In one embodiment, the radiuses of the arc pathways of the S shaped cable pathway are designed to meet the minimum bending requirements of the cable to be stored on the spool. In one embodiment, cable is stored in the spool by first inserting a middle portion of cable to be stored in the spool in S shaped cable pathway and then rotating the spool in a first direction.

14 Claims, 6 Drawing Sheets

U.S. PATENT DOCUMENTS 5,890,674 A * 4/1999 Major .................... 242/587
6,328,243 B1 * 12/2001 Yamamoto ............... 242/378.1
6,405,961 B1 * 6/2002 Mastrangelo ............ 242/378.1
6,533,216 B1 * 3/2003 Bumgarner et al. ......... 242/603

* cited by examiner

FIBER OPTIC CABLE SPOOL

This application is a continuation of, and claims the benefit of priority based on, U.S. patent application Ser. No. 09/590,811 now U.S. Pat. No. 6,511,009 B1, entitled "Fiber Optic Cable Spool" filed Jun. 9, 2000 issued Jan. 28, 2003, and naming Carl G. Harrison and Michael A. Mandry as inventors. The above-referenced patent is hereby incorporated by reference herein in its entirety.

BACKGROUND OF THE INVENTION

1. Field of the Invention

This invention relates in general to communication systems and in particular to a spool for storing communications cable.

2. Description of the Related Art

Fiber optic cables are utilized in communications systems for carrying information between communication sources and sinks. An example of a communications system that utilizes fiber optic cable is an optical cross connect for a communications network.

Fiber optic cable typically includes at least one glass core for optical, high bandwidth transmission of information. Typically, fiber optic cable requires a minimum bending radius (e.g., a one-inch bending radius) to avoid damaging the glass core and to avoid producing a large dB loss in the transmission of information through the cable.

Improper handling of fiber optic cable during shipment and installation can damage the cable. Twists or kinks in the cable can cause microcracks, which over time can propagate in the cable and decrease the reliability and longevity of the system and result in costly field repairs and replacements.

Carriers are utilized in some communication systems for supporting fiber optic cable during manufacture, shipment and normal operation of a system. An example of a carrier is an 8×8 perfect shuffle carrier which holds two sets of eight, 8-fiber ribbon cables where each fiber of each cable of the first set is optically coupled via an 8×8 perfect shuffle optical flex circuit main body to a fiber of a cable of the second set to implement a perfect shuffle optical flex circuit. Such a shuffle may be implemented with splices that are held in the carrier. In one example, the splices are made in the factory to reduce expenses and manufacturing time and to assure quality. The splices and cable are then shipped in the carrier to a use location, where each cable is coupled to a communications circuit, such as a matrix card. To prevent damage to the cables during shipping, each cable is wrapped around a separate spool where cables enter and exit the spool in different rotational directions. Some spools include two circumferential pathways. The storage of the fiber must be accomplished in a small space while maintaining the required minimum bending radius.

What is needed is an improved technique for storing cable during shipping and during the operation of a communication system.

SUMMARY OF THE INVENTION

It has been discovered that providing a spool with an S shaped groove connecting two circumferential pathways advantageously provides an improved technique for managing cable during shipment, installation, and/or normal operation of a communication system.

In one aspect of the invention, an apparatus includes a spool defining a first circumferential cable pathway. The spool defines a second circumferential cable pathway. The spool defines an S shaped cable pathway extending generally through a middle region of the spool. The S shaped cable pathway connects the first circumferential cable pathway with the second circumferential cable pathway.

In another aspect the invention includes a method for rolling up excess fiber optic cable on a spool. The method includes placing a first portion of a fiber optic cable to be rolled up in an S shaped cable pathway of the spool extending from a first circumferential pathway of the spool to a second circuit pathway of the spool. The method also includes rotating the spool in a first direction wherein the rotation wraps a second portion of the fiber optic cable located on a first side of the first portion in the first circumferential pathway and wherein the rotation wraps a third portion of the fiber optic cable located on a second side of the first portion in the second circumferential pathway.

In another aspect of the invention, an apparatus including fiber optic cable also includes a carrier and a spool attached to the carrier. The spool defines a first circumferential cable pathway and a second circumferential cable pathway. The spool defines an S shaped cable pathway connecting the first circumferential cable pathway with the second circumferential cable pathway. The apparatus also includes a plurality of fiber optic cables secured to the carrier. Each cable of the plurality of cables includes an excess portion wound in the spool. A middle portion of the excess portion is located in an S shaped cable pathway. Each excess portion further includes a second portion located on a first side of the middle portion. The second portion is wound in the first circumferential cable pathway. Each excess portion further includes a third portion located on a second side of the middle portion. The third portion is wound in the second circumferential cable pathway.

In another aspect of the invention, a cable storage apparatus includes a spool defining a first circumferential cable pathway and a second circumferential cable pathway adjacent to the first circumferential cable pathway. The spool defines an interior cable pathway connecting the first circumferential cable pathway at a first location with the second circumferential cable pathway at a second location.

In another aspect of the invention, an apparatus includes a spool defining a first circumferential cable pathway and a defining a second circumferential cable pathway. The spool further includes means for connecting the first circumferential cable pathway with the second circumferential cable pathway such that a cable externally enters the first circumferential cable pathway in a same rotational direction as the cable externally exits the second circumferential cable pathway.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
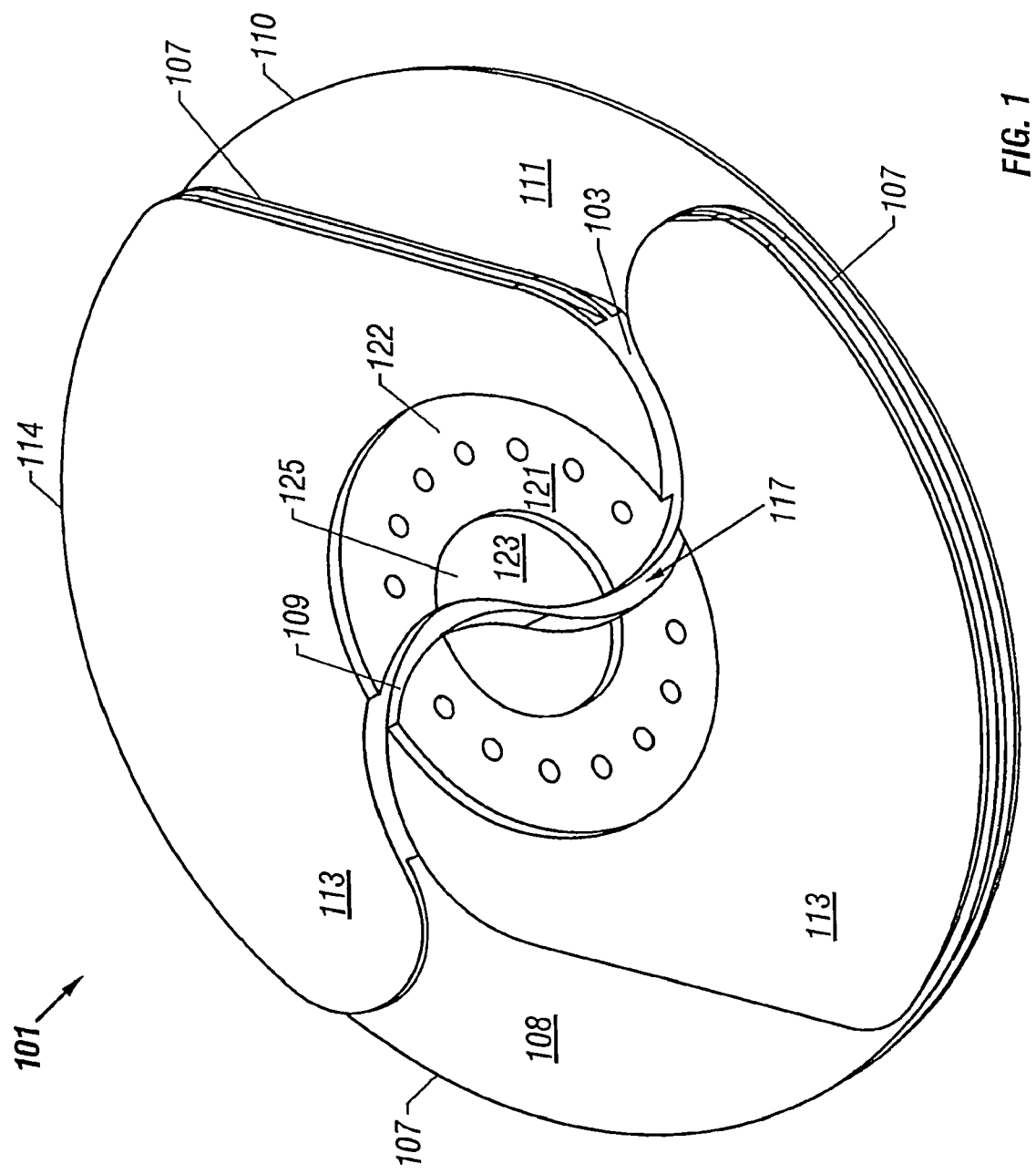
FIG. 1 is a perspective view of an example of a fiber optic spool according to the present invention.

FIG. 1 is a perspective view of a fiber optic cable spool according to the present invention. Fiber optic cable spool 101 can be utilized for storing excess fiber optic cable in a communication systems such as, e.g., a wavelength router-class, optical cross connect for a communications network.

Spool 101 includes an S shaped cable pathway 103 that extends through a middle region of spool 101. S shaped cable pathway 103 connects a first circumferential cable pathway with a second circumferential cable pathway. Circular inner wall structure 107 separates the first circumferential cable pathway from the second circumferential cable pathway. For the embodiment shown, S shaped cable pathway 103 is formed by an S shaped channel 109 in spool 101. S shaped channel 109 includes a base 117 and two sidewalls extending from base 117 to outside surfaces 113 of outer wall structure 114, outside surface 121 of annular rivet portion 122, and outside surface 123 of center portion 125. Base 117 is sloped from surface 108 of circular inner wall structure 107 to inner surface 111 of outside circular wall structure 110. With other embodiments, the S shaped pathway may be defined by other structures such as, e.g., posts or arc structures. With some embodiments, the structures that define the S shaped pathway are not continuous from one end of the S shaped pathway to the other.

In one embodiment, spool 101 is integrally formed from a plastic resin material such as, e.g., GE resin CYCOLOY C2800. With other embodiments, a spool according to the present invention may be made of other material such as, e.g., metal, wood, or other types of plastics. Also with other embodiments, a spool may be made of separately formed components.

Figure 2:
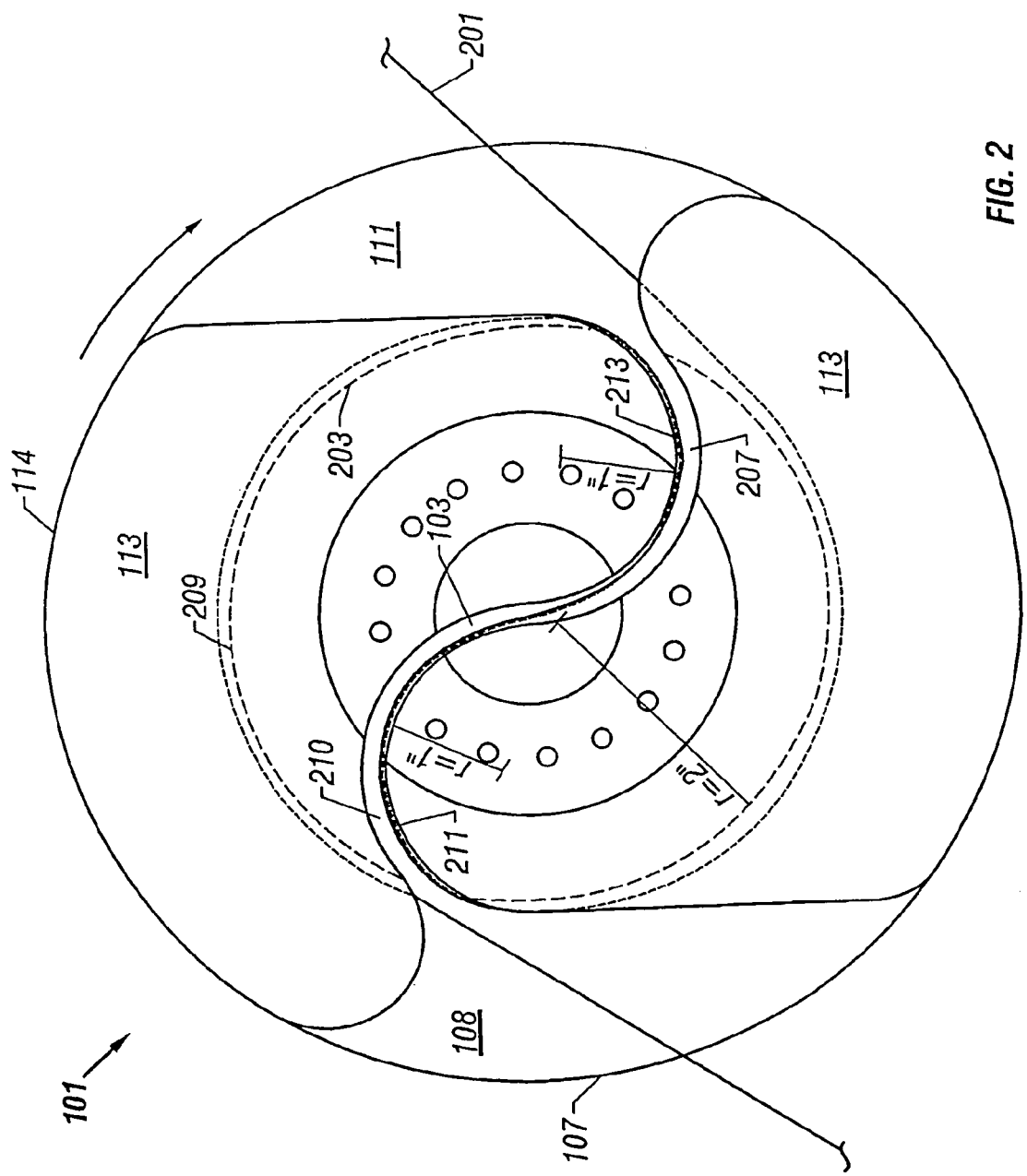
FIG. 2 is a side view of an example of a fiber optic spool according to the present invention.

FIG. 2 is a side view of spool 101. Also shown in FIG. 2 is fiber cable 201. S shaped pathway 103 includes two arc pathways, 207 and 210. Each arc pathway (207 and 210) has a radius designed to meet the minimum bending requirements of a fiber optic cable to be stored on the spool. In the embodiment shown, arc pathways 207 and 210 each have a radius of 1".

In FIG. 2, the location of the base of the first and second circumferential pathways is shown by long dashed lines 209. A substantial majority of the bases of the first and second circumferential pathways are defined by a radial surface 305 (see FIG. 3) and a radial surface 307 (see FIG. 3), respectively. Radial surface 307 is located at the same radial location as radial surface 305. Radial surface 305 is located between outer circular wall structure 110 and inner circular wall structure 107. Radial surface 307 is located between outer circular wall structure 114 and inner circular wall structure 107. In one embodiment, circular wall structures 110, 107, and 114 extend out 3¼ inches from radial surfaces 305 and 307.

The circumferential cable pathways of spool 101 have the shape of concentric circles. However, in other embodiments, the circumferential cable pathways may have other shapes such as, e.g., an oval, egg, or a non conventional shape.

Figure 3:
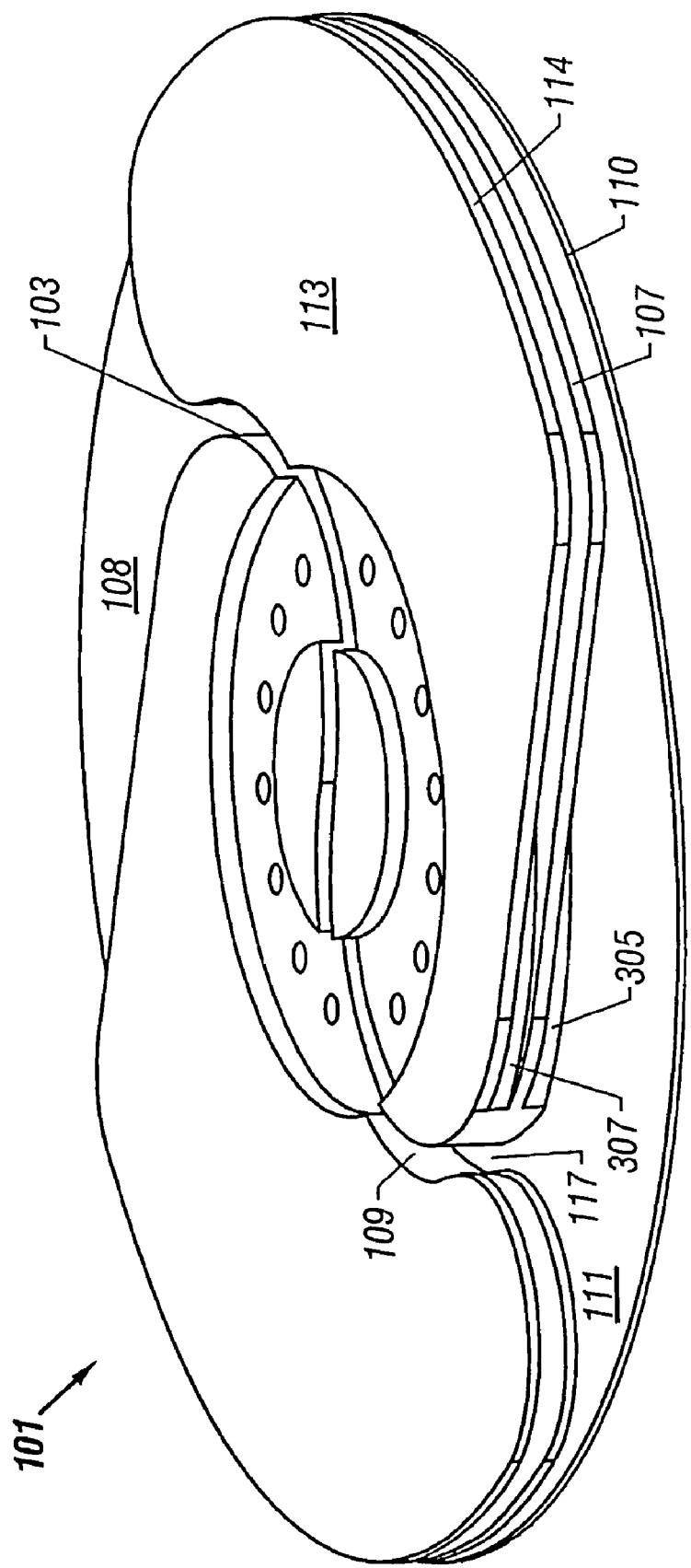
FIG. 3 is another perspective view of an example of a fiber optic spool according to the present invention.
Figure 4:
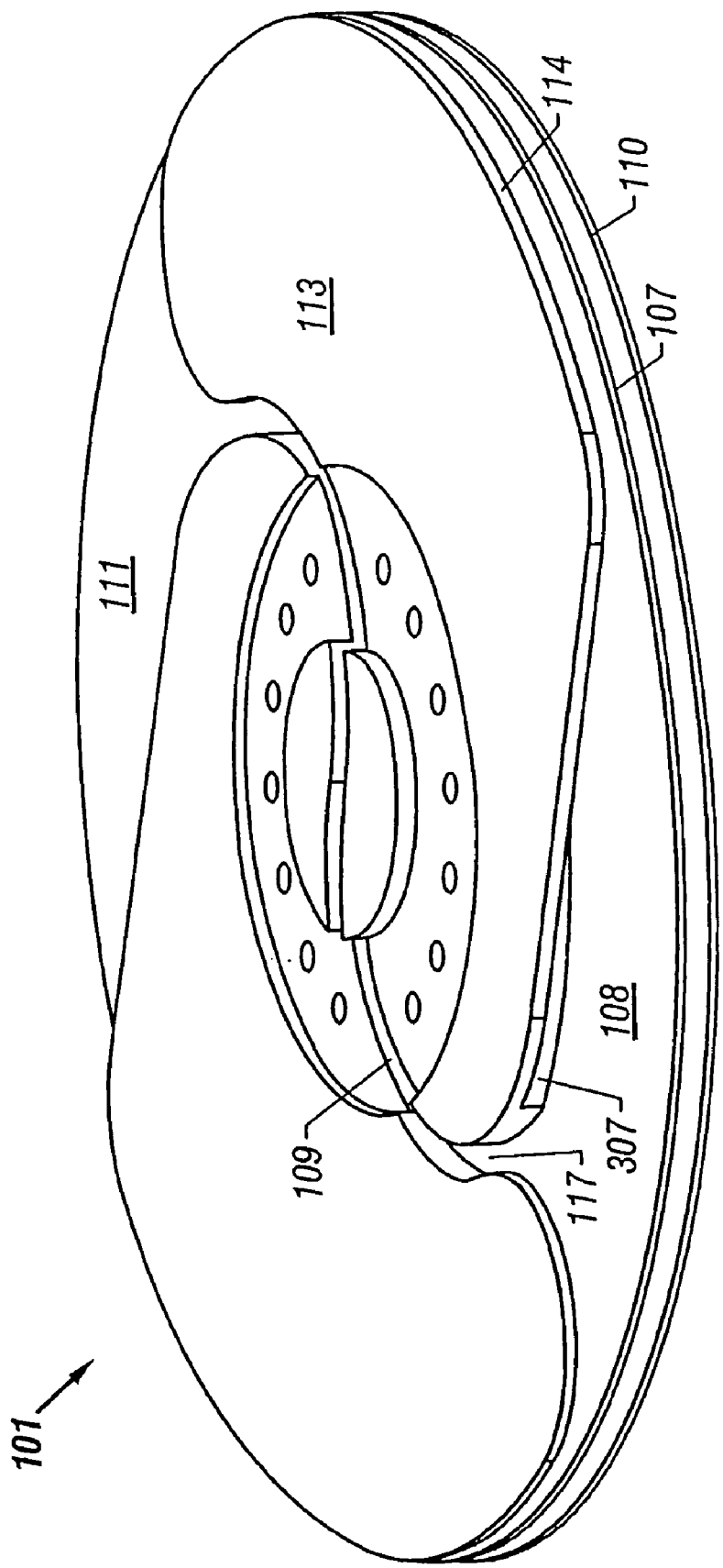
FIG. 4 is another perspective view of an example of a fiber optic spool according to the present invention.

FIGS. 3 and 4 show perspective views of spool 101. FIG. 3 shows the first end of S shaped cable pathway 103 where S shaped cable pathway 103 connects with the first circumferential pathway defined by radial surface 305 and defined by circular wall structures 107 and 110. Both radial surfaces 305 and 307 include radial breaks for S shape groove 109. As shown in FIG. 3, base 117 of S shaped groove 109 is integrally connected to the inner surface 111 of circular wall structure 110.

FIG. 4 shows a second end of S shaped cable pathway 103 where S shaped cable pathway connects with the second circumferential pathway defined by radial surface 307 and circular wall structures 107 and 114. Radial surface 307 includes a radial break for S shaped groove 109. Base 117 is integrally connected to side 108 of inner circular wall structure 107.

Referring back to FIG. 2, cable 201 is shown wound approximately once around spool 101. The portions of cable 201 hidden behind circular wall structures 114 or 114 and 107 are shown in FIG. 2 with small dashed lines. Entering from the right side of FIG. 2, cable 201 initially resides in the first circumferential cable pathway against radial surface 305 at the bottom of spool 101, relative to the view shown in FIG. 2. Cable 201 enters S shaped groove 103 at the left end, relative to the view shown in FIG. 2, and resides against the inner wall 211 of arc pathway 210, which is the bottom wall, relative to the view shown in FIG. 2. In arc pathway 207, cable 201, resides against inner wall 213, which is the top side wall, relative to the view shown in FIG. 2. Cable 201 exits S shaped cable pathway 103 at the right end, relative to the view shown in FIG. 2, and enters the second circumferential pathway and resides against radial surface 307. Cable 201 remains in the second circumferential pathway until it exits spool 101 on the left side, relative to the view shown in FIG. 2.

As shown in FIG. 2, rotating spool 101 in a clockwise direction, relative to the view shown in FIG. 2, wraps the portion of cable 201 located on the right side of FIG. 2 in the first circumferential cable pathway and wraps the portion of cable 201 located on the left side of FIG. 2 in the second circumferential cable pathway. In some embodiments, the circumferential cable pathways are just wide enough for one cable winding to reside at a radial layer. For these embodiments, rotation of spool 201 winds the cable on a previous cable winding. With other embodiments, the circumferential pathways are wide enough to have multiple cable windings at each radial layer.

To store excess cable in spool 101, a user first determines the location of the middle portion of the excess cable to be stored. The user then inserts the cable in S shaped pathway 103 with the determined middle portion being inserted at the center of S shaped pathway 103. Referring to FIG. 2, a portion of the cable extending from the left end of S shaped pathway 103, relative to the view shown in FIG. 2, is placed in the circumferential pathway defined by radial surface 307. A portion of the cable extending from the right end of S shaped cable pathway, relative to the view shown in FIG. 2, is placed in the circumferential pathway defined by radial surface 305. Spool 201 is then rotated clockwise, relative to the view shown in FIG. 2, wherein the cable to the right of the determined middle portion, relative to the view shown in FIG. 2, is wrapped in the circumferential pathway defined by radial surface 305, the cable to the left of the determined middle portion, relative to the view shown in FIG. 2, is wrapped in the circumferential pathway defined by radial surface 307.

One advantage of providing an S shaped cable pathway is that it allows the direction of one side of the cable to be reversed so the cable can be rolled up in both directions by rotating the spool. Having the S shaped cable pathway connect a first circumferential pathway with a second circumferential pathway provides for a "smooth" transition between the first and second circumferential pathways which aids in reducing the possibility of kinks in the fiber optic cable. Furthermore, for an S shaped cable pathway having matching arc radiuses, the S shaped cable pathway allows for both ends of the cable to be wound in the same direction and yet allows for a minimal radius of the circumferential cable pathways such that the radius of the circumferential pathways is equal to 2 times the radius of the arc pathways or two times the minimum bending radius.

Figure 5:
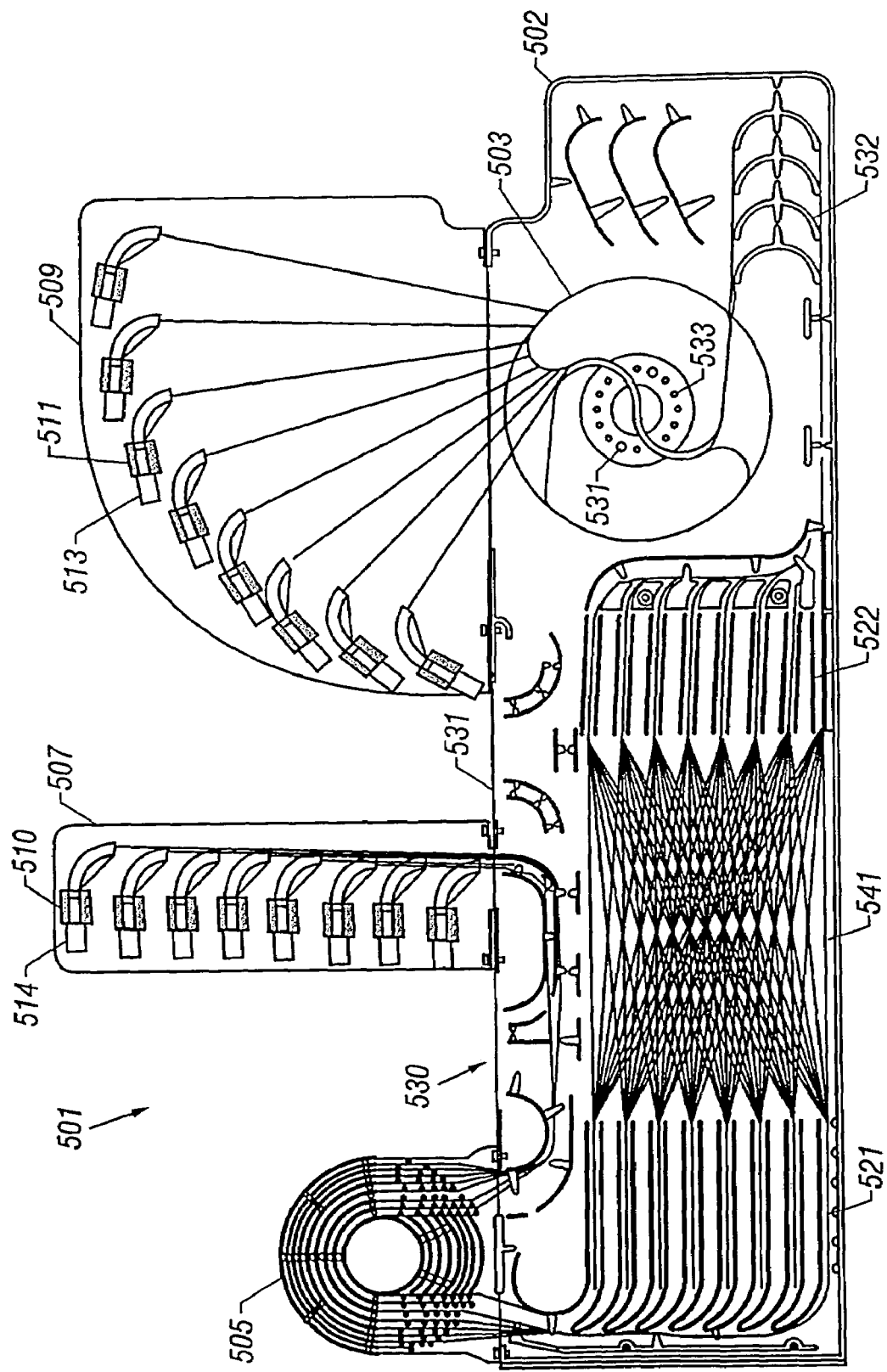
FIG. 5 is a side view of an example of a fiber optic carrier assembly according to the present invention.

FIG. 5 is a side view of a carrier assembly according to the present invention. Carrier assembly 501 is utilized to ship and install a 8×8 perfect shuffle optical flex circuit. Carrier assembly 501 includes a carrier 502 and a spool 503 attached to carrier 502. Spool 503 is similar to spool 101. Carrier assembly 501 also includes a wing 505 with discontinuous wall structures attached to carrier 502 for storing excess fiber optic cable. A further description of wing 505 can be found in a patent application entitled "Fiber Optic Cable Storage Device", having inventors Michael M. Mandry and Denise L. Smart, and having a common assignee and filing date, all of which is incorporated by reference in its entirety.

Also attached to carrier 502 are connector storage wings 507 and 509. Storage wings 507 and 509 each include eight integral clips 510 and 511, respectively, for securing multiple fiber, optical connectors 514 and 513, respectively, to the wing connectors, thereby protecting the cables from damage during shipment. An example of a multiple fiber, optical connector is an MPX connector sold by AMP. A further explanation of connector wings 507 and 509 can be found in a patent application entitled "Fiber Optic Cable Connector Clip," having listed inventor Michael A. Mandry, and having a common assignee and filing date, all of which is incorporated by reference in its entirety.

Carrier 502 includes cable paths and cable holders for holding two sets of eight, 8-fiber ribbon cable legs. Each leg of the first set of cable legs is terminated with one of connectors 514. The first set of cable legs is routed from rotational translation and oscillation damping fusion splice holders 521, through wing 505, to connector wing 507. Each leg of the second set of cable legs terminates at a connector 513 secured to a clip 511 of connector storage wing 509. The cable legs of the second set are routed from rotational translation and oscillation damping fusion splice holders 522, through arc structures 532 through spool 503 where excess slack in the second set is stored, to connector wing 509. At the interior edge of splice holders 521 and 522, the eight fibers of each leg of the first and second sets, respectively, are each spliced to a fiber of the optical flex circuit main body 541 to implement a perfect shuffle optical flex circuit. In one embodiment, optical flex circuit main body 541 is encapsulated in a laminate (not shown). In one embodiment, the cable legs of the first set are one meter in length and the cable legs of the second set are nine meters in length.

Spool 503 allows excess cable of the first set of cable legs to be rolled up. To roll up multiple cables, the middle portion of each cable to be rolled up is placed in the S shaped cable pathway (e.g., 103) wherein spool 503 is rolled clock wise, relative to the view shown in FIG. 5, to wind the cable legs around spool 503. Spool 503 is attached with rivets 531 inserted into two of the annular rivet holes 533. In the embodiment shown, rivet holes 533 are positioned around the center of spool 503 to allow spool 503 to be secured to carrier 502 at 22.5 degree increments. In some embodiments, the fiber optic spool is rotatably attached to carrier 502.

In one embodiment, prior to the fibers of both sets of cable legs being spliced to fibers of main body 541, both sets of cable legs are secured in carrier assembly 501, with the excess slack in the second set of cable legs being taken up by spool 503. In some embodiments, after the splicing, the cable legs may be removed from spool 503 and rewound to tightly secure the cable in carrier assembly 501.

An advantage of the spool shown in FIGS. 1-5 is that the S shaped cable pathway 103 is open on one side of the spool, thereby allowing a cable to be stored in the spool without having to access the other side of the spool or without having to remove parts of the spool.

After installing carrier assembly 501 in a communications system housing (e.g., 601 in FIG. 6), each connector 513 and 514 is connected to a corresponding connector located in the housing.

Figure 6:
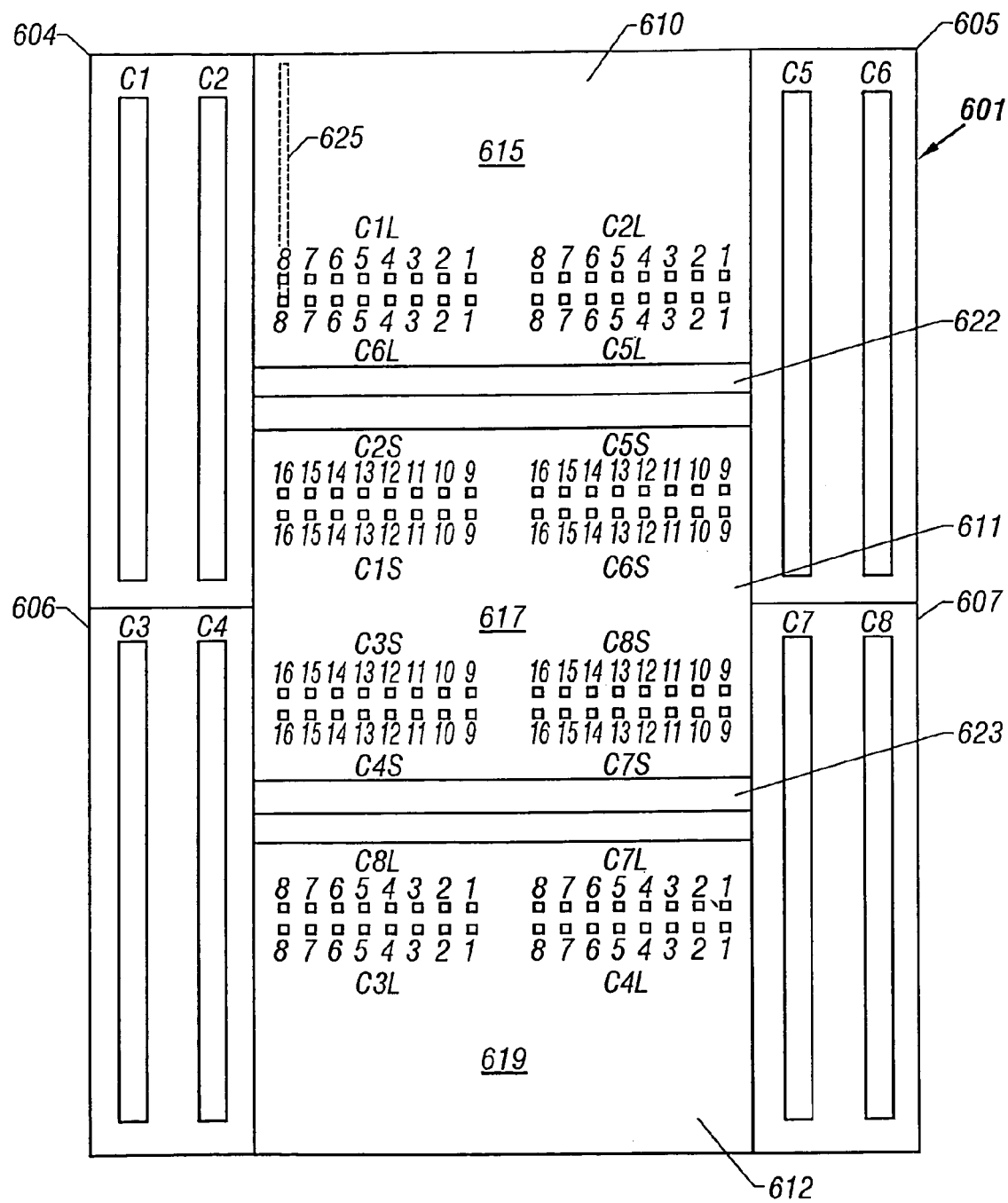
FIG. 6 is a rear view of an example of a communication system cabinet according to the present invention.

FIG. 6 shows a rear view of a matrix bay for a communication system. In one embodiment, matrix bay 601 is utilized in a wavelength router-class, optical cross connect. A wavelength router-class, optical cross connect typically provides infrastructure class intelligent intercouplability between several optical signals which can be switched electronically to couple any two of the optical signals. In one embodiment, the system receives up to 4,096 1+1 optical signals. The system may have numerous redundancy protection schemes such that in the event of an isolated equipment failure, alternate paths for the optical signals will be automatically utilized to assure continuous couplability. Due to its nature, a wavelength router-class, optical cross connect includes a multitude of fiber optic cables.

Matrix bay 601 includes 4 matrix side chassises, 604, 605, 606, and 607. Shown located in matrix side chassis 604 are carriers C1 and C2. Shown located in matrix side chassis 605 are carriers C5 and C6. Shown located in matrix side chassis 606 are carriers C3 and C4, and shown located in matrix side chassis 607 are carriers C7 and C8. Each of the carriers C1-C8 include an 8×8 perfect shuffle optical flex circuit similar to the one shown in FIG. 5. Up to eight carriers may be housed in each matrix side chassis. Matrix bay 601 includes 3 matrix card chassises 610, 611, and 612. Located in matrix card chassises 610, 611, and 612 are backplanes 615, 617, and 619, respectively. Mounted in the backplanes are connectors (designated 1-16) that are compatible with the connectors (e.g., 513 and 514) that terminate the cables originating from carriers (C1-C8).

The connectors from each of the carriers are connected to one of the connectors mounted on backplanes 615, 617, or 619. For example, the connectors that terminate the long cable legs of carrier C1 are connected to connectors C1L1-C1L8 mounted to backplane 615 in chassis 610. The connectors that terminate the short cable legs of carrier C1 are connected to connectors C1S9-C1S16 mounted to backplane 617 of chassis 611. In the embodiment shown, all of the short cable legs from each carrier are coupled to connectors mounted to backplane 617 in middle chassis 611. In other systems, each matrix chassis may include a greater or lessor number of connectors, depending upon the capacity of the system. With some systems, the matrix chassises include 16 connectors for each carrier slot in a matrix side chassis. With one embodiment, the matrix side chassises have a capacity of housing 32 carriers wherein the matrix card bays have 780 optical connectors, with 520 of the optical connectors dedicated to the cables of each carrier.

The connectors mounted in chassises 610, 611, and 612 are operably coupled to matrix cards (not shown) located behind backplanes 615, 617, and 619, respectively. Matrix card 625 is shown in phantom in FIG. 6. Other matrix cards are similarly orientated behind backplanes 615, 617, and 619. Each carrier includes an 8×8 perfect shuffle optical flex circuit that enables each of a first set of eight matrix cards to be coupled to each of a second set of eight matrix cards.

Referring back to FIG. 5, carrier 502 includes two cable paths 530 and 531. When the carrier is installed in a matrix side chassis (e.g., 604), cable exits the carrier via cable path 530 or 531, wherein the cables of the carrier are connected to corresponding connectors housed in chassises 610, 611, or 612. Cable paths 530 and 531 are located on the edge of carrier 502 that faces outward from a matrix side chassis (e.g., 606) when carrier 502 is installed in the matrix side chassis. After exiting a cable path (e.g., 531 or 530), the cable legs are routed through cable trays (e.g., 622 and 623) to their appropriate connectors in the matrix card chassises. In FIG. 6, the cables extending from carriers C1-C8 are not shown for simplicity of the drawing.

When the all of the connectors (e.g., 513) of a carrier (e.g., 502) are connected to the connectors (e.g., C3L4) of the matrix card chassises, the wings (e.g., 505, 507, and 509) are removed from the carrier. Excess slack in the long cable legs can be wound up in the spool (e.g., 503).

Spool 503 advantageously can be used to store excess cable when the fibers are being spliced to form a perfect shuffle optical flex circuit, when the carrier assemblies are being shipped, and when the cables are connected for normal operations in the communications system housing.

Those of skill in the art will recognize that, based upon the teachings herein, several modifications may be made to the embodiments shown in FIGS. 1-6. For example, a spool according to the present invention may be utilized with other communication devices and/or may be attached to other structures such as, e.g., housing structures of a communication system. Also, a spool according to the present invention may be utilized to hold other types of fiber optic cable such as single fiber cable. Furthermore, a spool according to the present invention may be utilized to store other types of cables such as, e.g., cables utilizing a metal conductive media.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. An apparatus comprising:
a spool comprising:
a plurality of radial surfaces; and
at least three wall structures extending from the radial surfaces, one or more inner wall structures of the wall structures separating radial surfaces in different planes from each other, wherein
the radial surfaces and wall structures define a first cable pathway and a second cable pathway,
a third cable pathway extends through at least one radial break separating first radial surfaces of the radial surfaces,
the first radial surfaces are located in a first plane,
the third cable pathway couples the first cable pathway to the second cable pathway,
the first cable pathway, the second cable pathway, and the third cable pathway are configured to receive a fiber optic cable without parts of the spool being removed,
the wall structures and the radial surfaces are integrally formed, and
a radius of a first arc of the third cable pathway is at least as large as a minimum bending radius of the fiber optic cable.

2. The apparatus of claim 1, wherein
the first radial surfaces in the first plane define a base of the first cable pathway,
one or more second radial surfaces of the radial surfaces define a base of the second cable pathway,
the one or more second radial surfaces are located in a second plane,
the one or more inner wall structures and a plurality of first wall structures of the wall structures define respective sides of the first cable pathway, and
the one or more inner wall structures and a second wall structure of the wall structures define respective sides of the second cable pathway.

3. The apparatus of claim 2, wherein
a base of the third cable pathway slopes from a surface of the one or more inner wall structures to a surface of the second wall structure.

4. The apparatus of claim 2, further comprising:
a first side wall structure defining a first side of the third cable pathway; and
a second side wall structure defining a second side the third cable pathway, wherein
the first side wall structure and the second side wall structure extend from a surface of the one or more first wall structures to a surface of the second wall structure.

5. The apparatus of claim 1, wherein
the first cable pathway and the second cable pathway are circular.

6. The apparatus of claim 1, wherein
the third cable pathway extends along a first arc and a second arc.

7. The apparatus of claim 6, wherein
the third cable pathway is an S-shaped cable pathway.

8. The apparatus of claim 7, wherein
the radial surfaces and the wall structures are comprised in a spool, the spool defining an S-shaped opening in one end of the spool for inserting the fiber optic cable into the third cable pathway.

9. The apparatus of claim 6, wherein
a radius of the first cable pathway is at least two times larger than the radius of the first arc.

10. The apparatus of claim 1, wherein
a radius of the first cable pathway is substantially equal to two times the minimum bending radius of the fiber optic cable.

11. The apparatus of claim 1, wherein the first cable pathway, the second cable pathway, and the third cable pathway are configured to receive a plurality of additional fiber optic cables.

12. The apparatus of claim 1, wherein the wall structures have substantially equal maximum radii.

13. The apparatus of claim 1, wherein
the spool comprises a plurality of rivet holes, wherein
the rivet holes pass through the spool in a direction substantially perpendicular to the first plane, and
the third cable pathway passes between at least two of the rivet holes.

14. The apparatus of claim 1, wherein
the axial width of the first cable pathway and second cable pathway is great enough to admit only one cable winding per radial layer.

* * * * *